United States Patent
Wollermann

[11] Patent Number: 5,414,931
[45] Date of Patent: May 16, 1995

[54] UNIVERSAL STRIPPING BLADE

[75] Inventor: Kenneth A. Wollermann, Mukwonago, Wis.

[73] Assignee: Artos Engineering, Waukesha, Wis.

[21] Appl. No.: 168,719

[22] Filed: Dec. 16, 1993

[51] Int. Cl.⁶ .............................................. H02G 1/12
[52] U.S. Cl. ...................... 30/90.1; 30/351; 30/241; 81/9.51
[58] Field of Search ............... 30/90.1, 90.2, 91.2, 30/241, 346, 351, 357; 81/9.4, 9.51, 9.41, 9.42, 9.43, 9.44; 83/693; 76/82.2

[56] References Cited

U.S. PATENT DOCUMENTS

| | | | |
|---|---|---|---|
| 2,316,869 | 4/1943 | Jabour | 30/91.2 |
| 2,660,783 | 12/1953 | Davis et al. | 30/91.2 |
| 2,818,641 | 1/1958 | Peterson | 30/91.2 |
| 3,180,184 | 4/1965 | Bradley | 30/90.1 |
| 3,203,289 | 8/1965 | Beekley | 83/693 |
| 4,577,405 | 3/1986 | Butler | 30/90.1 |
| 4,852,433 | 8/1989 | Butler | 81/9.51 |
| 4,870,878 | 10/1989 | Butler et al. | 81/9.51 |
| 4,961,357 | 10/1990 | Butler et al. | 81/9.51 |
| 4,972,582 | 11/1990 | Butler | 30/90.1 |
| 5,025,687 | 6/1991 | Butler | 81/9.51 |
| 5,067,379 | 11/1991 | Butler et al. | 83/13 |
| 5,172,620 | 12/1992 | Faust | 83/13 |

OTHER PUBLICATIONS

Lakes Precision Incorporated Brochure and Price List, 1991/1992.

Primary Examiner—Eugenia Jones
Assistant Examiner—Allan M. Schrock
Attorney, Agent, or Firm—Andrus, Sceales, Starke & Sawall

[57] ABSTRACT

A blade for cutting insulation from an insulated electrical conductor. The blade includes first and second opposed surfaces interconnected by an end. The end has an opening extending at a compound angle toward the interior of the blade. The opening is defined by a first pair of cutting edges converging at an angle less than 90° toward the interior of the blade member and a second pair of cutting edges intersecting the first pair of cutting edges and converging toward the interior of the blade at a second non-parallel angle greater than the first angle. The blade is capable of maximizing the portion of the insulation that is cut from various size insulated conductors.

11 Claims, 2 Drawing Sheets

UNIVERSAL STRIPPING BLADE

BACKGROUND OF THE INVENTION

This invention relates to an apparatus for cutting and stripping insulation from an electrical conductor, and more particularly, to a blade for cutting insulation from electrical wire of various sizes.

The conventional wire cutting and stripping machine includes a cutting head that consists of a pair of cooperating cutting blades and two pair of cooperating stripping blades, one pair of which is located upstream of the cutting blades and the other pair is located downstream of the cutting blades. After the insulated wire or conductor is fed to the cutting head, the cutting blades operate to sever the insulated conductor and provide a cut length, while the stripping blades act to merely cut the insulation. With the stripping blades still closed, the insulated conductor is pulled in an upstream direction and the cut length is pulled in a downstream direction, thereby pulling a slug of insulation from both the conductor and the cut length.

There are four basic types of blades for high production stripping of insulation from insulated electrical conductors, the die type or butt style, the V blade with a base radius, the V blade with a 90° angle and little or no radius in the base, and the compound angle blade. Each cutting blade is designed to cut the insulation without nicking or scoring the conductor. A nick in the conductor decreases the conductor's electrical current carrying capacity so as to produce stress concentrations in the conductor. Strength concentrations in the conductor decrease the conductor's tensile strength. In the die type or butt style design, a pair of knife blades form two halves of a through hole. The two blades are closed over the insulation of a specifically sized insulated conductor at the desired location thereon. The through hole is designed to closely conform to the configuration of the conductor. This hole controls the depth of the cut and prevents nicking and scoring of the conductor.

While the die type blade adequately cuts the insulation about a specifically sized insulated conductor, the die type or butt style blade suffers from three disadvantages. First, a pair of die type blades may be used only with one size of insulated conductor. If the blades are used on a different size wire, the insulation may not be completely cut or the blades may nick and score the conductor.

Second, squeezing of the insulation between the conductor and the blades may prevent the blades from fully closing onto the conductor. As a result, the portion of the insulation which is not completely cut through to the conductor must be torn from the parent insulation. The physical characteristics of some insulation material makes it difficult to tear, so it is desirable to minimize the uncut portion of the insulation.

Third, die type or butt style blades have a low tolerance for accommodating off center insulated conductors transported between the open blades. In many applications, special wire guides in the form of mechanical fingers are required to insure the insulated conductor is on the center line of the closed blades.

A V blade with a base radius is manufactured with a sharp edge cutting radius at the base of the V for slicing through the insulation. While more versatile than the die type blade, the V blade with a base radius is limited to only a slight range in wire size. Because of the V-angle, the cutting radii may not form a full circle around the conductor when the blades are closed. As a result, a portion of the insulation remains uncut and must be torn from the parent insulation during the stripping operation.

The V blade with a 90° angle and little or no radius in the base is the most universal of the basic types of cutting blades. As with the V blade with a base radius, the V blade with a 90° angle does not form a full circle around the conductor when the blades are closed. However, for smaller size wires, the portion of the insulation which remains uncut is insignificant. However, in larger sizes of wire, a large portion of insulation remains uncut. As previously described, tearing a substantial portion of the insulation from the parent insulation during the stripping operation is undesirable.

The compound angle blade is illustrated in U.S. Pat. No. 4,577,405 to Butler. The compound angle blade is designed to gather greatly offset insulated conductors while increasing the circumferential contact between the blades and the conductor. The blade is designed with a pair of angled paths or openings leading to a radiused cutting edge. While the compound angle blade shown in the Butler patent is adequate for slight variations in wire size, the compound angle blade suffers from the same inadequacies as the other basic types of cutting blades. When there is a large range of wire sizes, a significant portion of insulation may remain uncut or the conductor may be nicked.

Therefore, it is a primary object and feature of this invention to provide a blade for cutting insulation from an insulated electrical conductor wherein the blade is capable of cutting a substantial portion of the insulation about the conductor without nicking or scoring the conductor.

It is a further object and feature of the present invention to provide a blade for cutting insulation from an insulated electrical conductor wherein the blade design minimizes the amount of insulation which remains uncut.

It is a still further object and feature of the present invention to provide a blade for cutting a substantial portion of the insulation about various size electrical insulated conductors.

SUMMARY OF THE PRESENT INVENTION

In accordance with the present invention, an implement or blade for cutting and stripping insulation on an insulated electrical conductor is provided which maximizes the amount of insulation cut while preventing nicks and scoring of the conductor. An opening or path is provided in one end of the blade and extends inwardly at a compound angle toward the interior of the blade. The opening is defined by a first pair of cutting edges which intersect the end and converge toward the interior of the blade. In a preferred embodiment, the first cutting edges converge at an angle of less than 90°.

The opening is also defined by a second pair of cutting edges which intersect the first pair of cutting edges and converge toward the interior of the blade at a second non-parallel angle greater than the first angle. In the preferred embodiment, the second angle is greater than 90°. The second pair of cutting edges converge into a sharp cutting radius or a vertex.

As described, the blade is capable of cutting a substantial portion of the insulation about an electrical conductor without nicking or scoring the conductor.

The compound angle design of the blade minimizes the amount of insulation which remains uncut, and yet enables the blade to be used with a wide variety of wire sizes or gauges.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
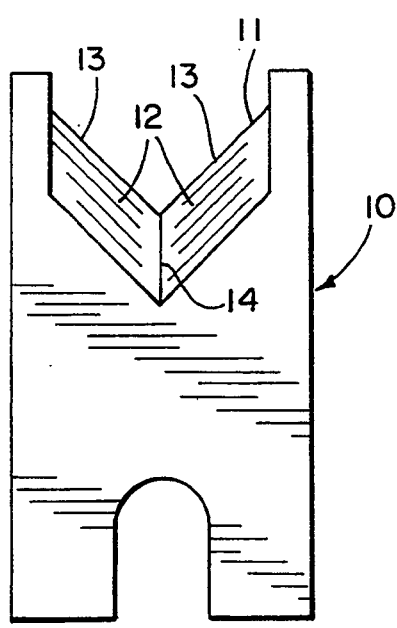
FIG. 1 is a plan view of a conventional V type blade for cutting insulation about an insulated electrical conductor.

FIG. 1 illustrates a prior art wire cutting and stripping blade 10 having a V-shaped path or opening 11 defined by a pair of walls 12 which converge toward the interior of the blade at an angle of about 90°. One side of each wall 12 defines a cutting edge 13 and the junction 14 between walls 12 has little or no radius.

A pair of cooperating V-type blades, as shown in FIG. 1, are capable of gathering off-set insulated conductors to the junction or vertex 13 because of the V-shaped opening, but due to the non-radiused vertex 14, leave a large portion of the insulation uncut, particularly when dealing with large diameter insulated conductors.

Figure 2:
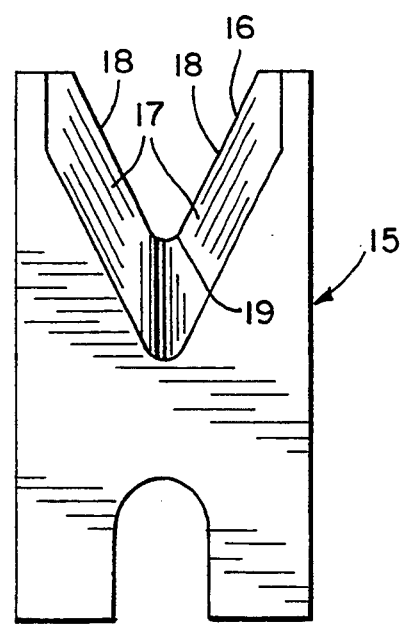
FIG. 2 is a plan view of a conventional V type blade with a base radius for cutting insulation about an insulated electrical conductor.

FIG. 2 illustrates another prior art blade 15 having a generally V-shaped opening or recess 16 in one end that is defined by a pair of converging walls 17. The sides of walls 17 define cutting edges 18 and the cutting edges 18 converge toward a radiused cutting edge 19. In practice, the cutting radius 19 is equal to one-half the outer diameter of the conductor to be stripped. The cutting edges 18 converge toward the interior of the blade at an angle less than 90°, and the inner ends of the cutting edges 18 are tangent to the cutting radius 19.

Like the V-blade shown in FIG. 1, the blade 15 of FIG. 2 acts to gather offset insulated conductors or wire to the cutting radius 19. However, the blade 15 is limited to only slight variations in wire size.

Figure 3:
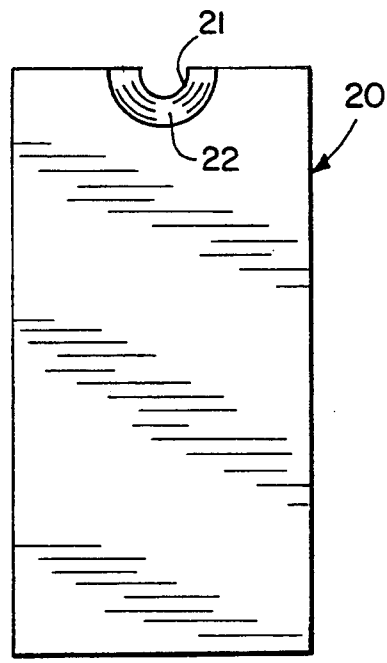
FIG. 3 is a plan view of a conventional die type or butt style blade for cutting insulation about an insulated electrical conductor.

FIG. 3 illustrates a prior art die-type blade 20 having a semi-circular recess 21 formed in one end of the blade and recess 21 is bordered by a semi-circular wall 22. When a pair of blades 20 are closed over an insulated wire, the walls 22 define a counterbored hole which is designed to closely conform to the outer configuration of the wire, while the cutting recesses 21 define a smaller hole which controls the depth of the cut.

Figure 4:
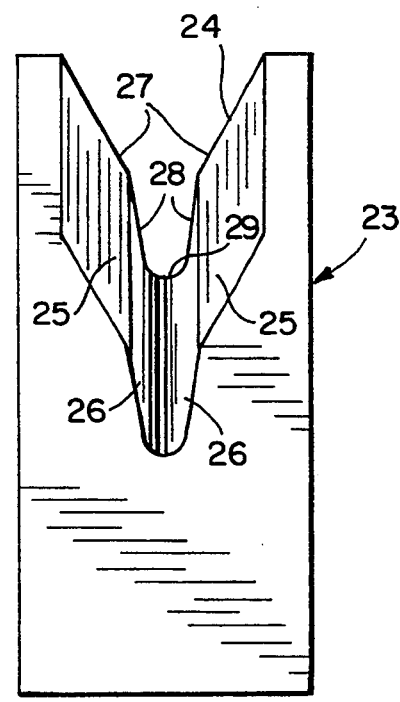
FIG. 4 is a plan view of a conventional compound angle blade for cutting insulation about an insulated electrical conductor.
Figure 5:
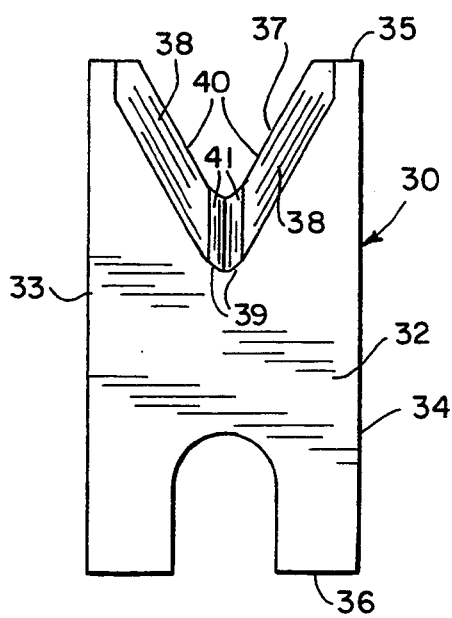
FIG. 5 is a plan view of a blade incorporating the present invention for cutting insulation about an insulated electrical conductor.

FIG. 4 shows a further prior art type of cutting blade 23, as described in U.S. Pat. No. 4,577,405, having a compound angle. One end of the blade 23 is provided with a generally V-shaped opening or recess 24, which is defined by a pair of outer converging walls 25, and a pair of inner converging walls 26 that intersect the first walls and converge at a second non-parallel angle greater than 0°, but less than 54°.

In the construction of FIG. 4, walls 25 are bordered by cutting edges 27, while walls 26 are bordered by cutting edges 28, and cutting edges 28 terminate in the radiused cutting edge 29.

In the construction of FIG. 4, the converging angle between the edges 27 is designed to gather the offset wire toward the cutting edge radius 29, while the second converging edges 28 are designed to cut the insulation about the periphery of the insulated wire. While the compound angle blade 23 is adequate for slight variations in wire size, it lacks the ability to accommodate a large range of wire size with only one blade.

FIG. 5–9 illustrate the blade of the invention. The blade 30 is generally rectangular in shape having a pair of opposed generally flat faces 31 and 32, which are joined by side edges 33 and 34 and ends 35 and 36. The end 35 is provided with a generally V-shaped opening 37, defined by a pair of converging outer walls 38 which extend inwardly from end 35 and a pair of second or inner walls 39, that intersect walls 38 and terminate in a vertex 45.

Walls 38 are bordered along face 31 by cutting edges 40 and similarly walls 39 are bordered along face 31 by cutting edges 41.

Figure 6:
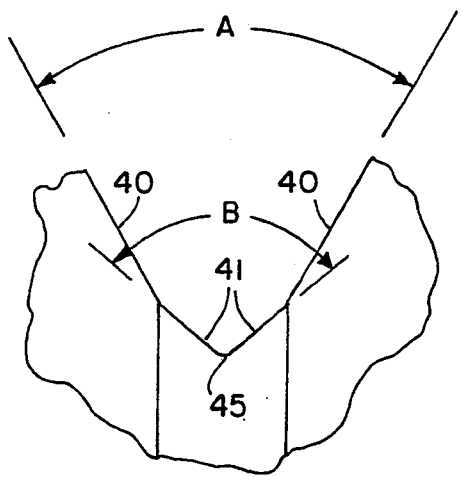
FIG. 6 is an enlarged view of a portion of the present invention shown in FIG. 5.

As best shown in FIG. 6, edges 40 converge at an angle A less than 90°, and preferably at an angle of about 55° to 65°, while edges 41 converge toward the interior of the blade at a second angle B, greater than angle A, and generally in the range of 95° to 105°.

Figure 9:
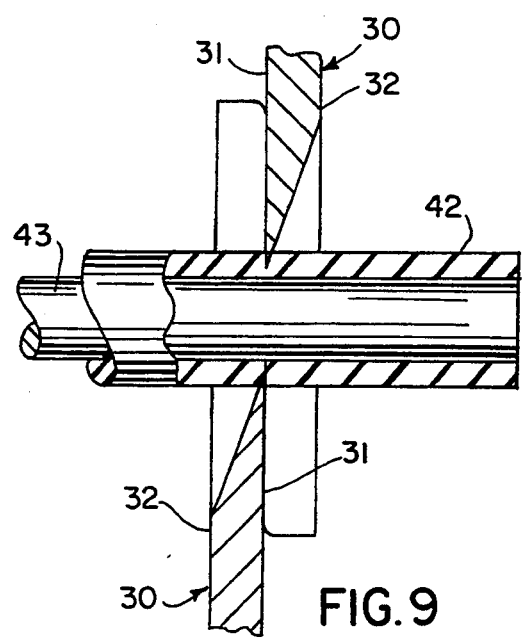
FIG. 9 is a cross-sectional view of a pair of blades of the invention of FIG. 5 in the closed position and cutting the insulation of an insulated conductor prior to stripping.

FIG. 9 illustrates a pair of blades 30 cooperating to cut the insulation 42 on a wire or conductor 43 that has been fed to the cutting head. In cutting the insulation 42, blades 30 are moved in a direction toward each other and conventional stops can be employed to limit the cutting stroke to the distance required for cutting the insulation without contacting the wire or conductor 43.

Figure 7:
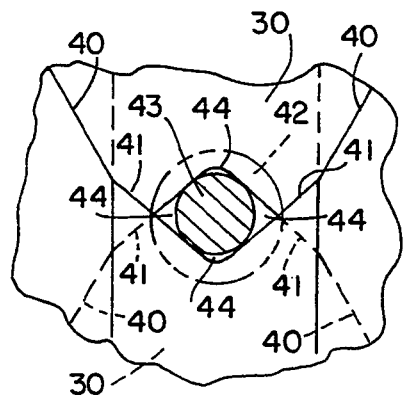
FIG. 7 is an enlarged view of a portion of the present invention cutting the insulation, of a small diameter insulated electrical conductor.

The blades 30 of the invention are capable of cutting the insulation on various size wires or conductors. FIG. 7 shows the blades 30 of the invention being used to cut the insulation on a small diameter conductor. As illustrated in FIG. 7, when the two blades 30 are brought together in the cutting stroke, the layer of insulation 42, shown by the phantom lines in FIG. 7, will be cut by the inner cutting edges 41, and only small portions of the insulation will remain uncut, as indicated by the areas 44. During the subsequent stripping action, the uncut areas 44, will be readily torn from the parent insulation.

Figure 8:
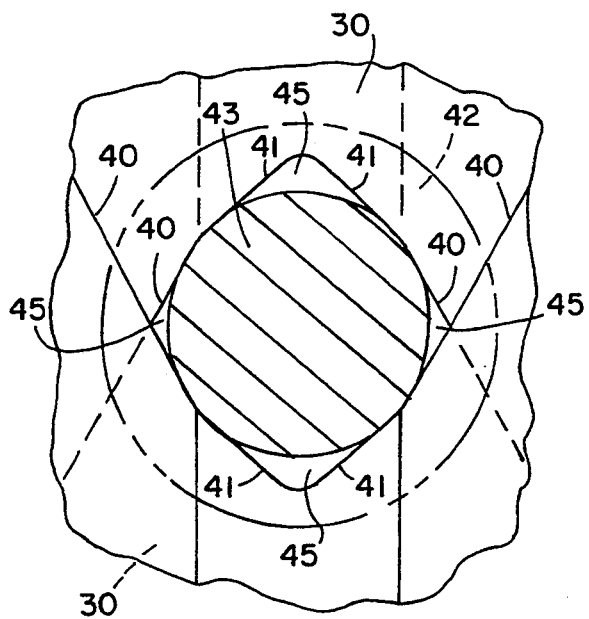
FIG. 8 is an enlarged view of the present invention cutting the insulation of a large diameter insulated electrical conductor shown in section.

FIG. 8 illustrates the use of the blades 30 in cutting larger diameter wire, and in this case when the blades 30 are moved toward each other in the cutting stroke, the insulation 42, shown in phantom in FIG. 8, will be cut by both the edges 40 and 41, again leaving four small uncut portions of insulation, indicated by 45. During the stripping action, these uncut portions 45 will be readily torn away.

The compound angle design of the blade of the invention, in which the cutting edges 41 are at a greater angle than the cutting edges 40, minimizes the amount of insulation which remains uncut, and enables the blade to be used with various size wires or conductors.

Various modes of carrying out the invention are contemplated as being within the scope of the following claims particularly pointing out and distinctly claiming the subject matter which is regarded as the invention.

I claim:

1. An implement for cutting insulation from insulated electrical conductors, comprising:

a blade member having first and second opposed surfaces and at least one end interconnecting the surfaces, said end having an opening extending at a compound angle toward the interior of the blade member, said opening being defined by a first pair of linear cutting edges extending from said end and converging at a first angle toward the interior of the blade member and a second pair of linear cutting edges intersecting the first pair of cutting edges and converging toward the interior of the blade at a second nonparallel angle greater than the first angle.

2. The implement of claim 1, wherein the first angle is less than 90°.

3. The implement of claim 1, wherein the second angle is greater than 90°.

4. The implement of claim 1, wherein the second pair of edges converge at a vertex within the interior of the blade member.

5. In an apparatus for cutting and stripping insulation from insulated electrical conductors, a pair of cooperating stripping blades mounted for reciprocal movement toward and away from each other, each blade having first and second opposed surfaces interconnected by an end, each end having an opening extending between the surfaces at a compound angle toward the interior of the blade, each opening being defined by a first pair linear of cutting edges intersecting the end and converging at a first angle toward the interior of the blade and a second pair of linear cutting edges intersecting the first pair of cutting edges and converging at a non-parallel second angle greater than the first angle toward the interior of the blade such that when the blades reciprocate toward each other, the cutting edges close over the insulated electrical conductor to cut the insulation and facilitate the stripping of the insulation.

6. The device of claim 5, wherein the first pair of cutting edges converge at an angle less than 90°.

7. The device of claim 5, wherein the second pair of cutting edges converge at an angle greater than 90°.

8. The device of claim 5, wherein the second pair of cutting edges converge at a vertex.

9. An implement for cutting insulation about an insulator electrical conductor, comprising:

a generally rectangular blade member having first and second faces and a first end interconnecting the faces, the first end having an opening extending between the faces at a compound angle toward an axis of the blade, the opening being defined by a first pair of cutting edges which intersect the first end and converge at a first angle less than 90° toward said axis of the blade member and a second pair of cutting edges intersecting the first pair of cutting edges and converging to a vertex at a second non-parallel angle greater than the first angle and greater than 90°.

10. The implement of claim 9, wherein the first angle is in the range of 55° to 65°, and the second angle is in the range of 95° to 105°.

11. An implement for cutting insulation from insulated electrical conductors, comprising:

a blade member having first and second opposed surfaces and at least one end interconnecting the surfaces, said end having an opening extending at a compound angle toward the interior of the blade member, said opening being defined by a first pair of cutting edges extending from said end and converging at a first angle toward the interior of the blade member and a second pair of cutting edges intersecting the first pair of cutting edges and converging to a vertex within the interior of the blade member, the second pair of cutting edges converging at a second nonparallel angle greater than the first angle.

* * * * *

UNITED STATES PATENT AND TRADEMARK OFFICE
CERTIFICATE OF CORRECTION

PATENT NO. : 5,414,931
DATED : May 16, 1995
INVENTOR(S) : Kenneth A. Wollermann It is certified that error appears in the above-identified patent and that said Letters Patent is hereby corrected as shown below:

Column 5, Line 43, Claim 5, after "pair" delete "linear" and after "of" insert ---linear---.

Signed and Sealed this

Twenty-fifth Day of July, 1995

Attest:

BRUCE LEHMAN

Attesting Officer

Commissioner of Patents and Trademarks